(12) United States Patent
Yoo

(10) Patent No.: US 10,180,335 B2
(45) Date of Patent: Jan. 15, 2019

(54) APPARATUS AND METHOD FOR ESTIMATING DIRECTION OF VEHICLE

(71) Applicant: Hyundai Motor Company, Seoul (KR)

(72) Inventor: Kyung Ho Yoo, Seoul (KR)

(73) Assignee: Hyundai Motor Company, Seoul (KR)

(*) Notice: Subject to any disclaimer, the term of this patent is extended or adjusted under 35 U.S.C. 154(b) by 77 days.

(21) Appl. No.: 15/358,360

(22) Filed: Nov. 22, 2016

(65) Prior Publication Data

US 2018/0073892 A1  Mar. 15, 2018

(30) Foreign Application Priority Data

Sep. 9, 2016 (KR) .......................... 10-2016-0116546

(51) Int. Cl.
| | | |
|---|---|---|
| G01C 21/22 | (2006.01) | |
| G01S 19/14 | (2010.01) | |
| G01S 19/28 | (2010.01) | |
| G01C 23/00 | (2006.01) | |
| G01C 21/30 | (2006.01) | |
| G01S 19/08 | (2010.01) | |
| G01S 19/42 | (2010.01) | |

(52) U.S. Cl.
CPC ............. *G01C 23/00* (2013.01); *G01C 21/30* (2013.01); *G01S 19/08* (2013.01); *G01S 19/423* (2013.01); *G01S 19/426* (2013.01)

(58) Field of Classification Search
CPC ....... G01C 23/00; G01C 21/30; G01S 19/426; G01S 19/423; G01S 19/08
See application file for complete search history.

(56) References Cited

U.S. PATENT DOCUMENTS 7,702,338 B2   4/2010 Wengler et al.

FOREIGN PATENT DOCUMENTS

| JP | H07-19884 A | 1/1995 |
|---|---|---|
| JP | H11-118896 A | 4/1999 |
| JP | H11-248454 A | 9/1999 |

(Continued)

OTHER PUBLICATIONS

Li, Lan, et al. "Azimuth angle of GPS point and its application in map-matching." Intelligent Transportation Systems (ITSC), 2012 15th International IEEE Conference on. IEEE, 2012. (Year: 2012).*

(Continued)

*Primary Examiner* — Alan D Hutchinson
(74) *Attorney, Agent, or Firm* — Mintz Levin Cohn Ferris Glovsky and Popeo, P.C.; Peter F. Corless

(57) ABSTRACT

An apparatus for estimating a direction of a vehicle includes: a vehicle position calculator calculating a current position of the vehicle and a current time using a received satellite signal; a satellite candidate predictor predicting satellite candidates that are observable at the calculated current position of the vehicle using ALMANAC data in which information about positions and azimuths of satellites is included and using the calculated current position of the vehicle and current time; a road candidate searcher searching road candidates positioned around the vehicle based on the calculated current position of the vehicle; and a direction estimator estimating the direction of the vehicle using information about the predicted satellite candidates and the searched road candidates.

13 Claims, 7 Drawing Sheets

(56) References Cited

FOREIGN PATENT DOCUMENTS

| JP | 2005-227066 A | 8/2005 |
|----|---------------|--------|
| KR | 10-1035533 B1 | 5/2011 |
| KR | 2014-0073977 A | 6/2014 |

OTHER PUBLICATIONS

Wikipedia article GPS Signals (Year: 2016).*
Machine Translation of JP 2005/227066, printed Apr. 24, 2018 (Year: 2005).*

* cited by examiner

```
******** Week 865 almanac for PRN-05 ********
ID:                          05
Health:                     000
Eccentricity:               0.4579544067E-002
Time of Applicability(s): 319488.0000
Orbital Inclination(rad):   0.9468879908
Rate of Right Ascen(r/s): -0.7840326581E-008
SQRT(A)  (m 1/2):        5153.710938
Right Ascen at Week(rad): -0.1818231622E-002
Argument of Perigee(rad): 0.468508292
Mean Anom(rad):            -0.1183736197E+001
Af0(s):                    -0.1354217529E-003
Af1(s/s):                   0.3637978807E-011
week:                       865
```

FIG. 3A

| SATELLITE NO. (PRN) | Range (km) | AZIMUTH | ELEVATION |
|---|---|---|---|
| 5 | 22820 | 107.6 | 30.4 |
| 13 | 21497 | 44.3 | 45.4 |
| 15 | 20249 | 332 | 72.5 |
| 18 | 23175 | 306 | 31.2 |
| 20 | 20213 | 60.8 | 77.7 |
| 21 | 22101 | 292.3 | 44.9 |
| ... | ... | ... | ... |

FIG. 3B

APPARATUS AND METHOD FOR ESTIMATING DIRECTION OF VEHICLE

CROSS-REFERENCE TO RELATED APPLICATION

This application claims the benefit of and priority to Korean Patent Application No. 10-2016-0116546, filed on Sep. 9, 2016 in the Korean Intellectual Property Office, the disclosure of which is incorporated herein in its entirety by reference as if fully set forth herein.

TECHNICAL FIELD

The present disclosure relates to an apparatus and a method for estimating a direction of a vehicle and, more particularly, to an apparatus and a method for estimating a direction of a vehicle capable of estimating the direction of the vehicle in a state in which the vehicle stops.

BACKGROUND

A global navigation satellite system (GNSS) is a system which can measure a position of a user using triangulation on the basis of signals received from an artificial satellite revolving around the earth. The GNSS may obtain various kinds of information about a position, a speed, a direction, a time, and the like of a user, a vehicle, or the like on the basis of the signals received from the artificial satellite. Among them, information about the position and the time may be calculated regardless of a change in the position of the user, while the speed and the direction are physical quantities calculated by movement of the user.

Vehicular navigation systems typically utilize the GNSS. Recently, as research into self-driving vehicles has increased, performance of a vehicle positioning system based on the GNSS has become important.

A method for estimating a direction on the basis of the GNSS, which uses a difference value of a movement amount generated by movement of the vehicle, suffers from a problem that the direction may not be recognized if the vehicle is stopped. In a system requiring a high level of positioning performance, such as those in self-driving vehicles, initial information about the position and direction of the vehicle is crucial in determining whether or not the vehicle departs. Therefore, in a self-driving vehicle, recognizing a direction of the vehicle even in a situation where the vehicle is stopped is necessary.

SUMMARY

The present disclosure has been made to solve the above-mentioned problems occurring in the related art while advantages achieved by the prior art are maintained intact.

An aspect of the present disclosure provides an apparatus and a method for estimating a direction of a vehicle in a state in which the vehicle is stopped. Particularly, an aspect of the present disclosure provides an apparatus and a method capable of estimating the direction of the vehicle using only a sensor of a global navigation satellite system (GNSS) and map data without including an additional sensor in a state in which the vehicle stops.

According to embodiments of the present disclosure, an apparatus for estimating a direction of a vehicle includes: a vehicle position calculator calculating a current position of the vehicle and a current time using a received satellite signal; a satellite candidate predictor predicting satellite candidates that are observable at the calculated current position of the vehicle using ALMANAC data in which information about positions and azimuths of satellites is included and using the calculated current position of the vehicle and current time; a road candidate searcher searching road candidates positioned around the vehicle based on the calculated current position of the vehicle; and a direction estimator estimating the direction of the vehicle using information about the predicted satellite candidates and the searched road candidates.

Furthermore, according to embodiments of the present disclosure, a method for estimating a direction of a vehicle includes: calculating a current position of the vehicle and a current time using a received satellite signal; predicting satellite candidates that are observable at the calculated current position of the vehicle using ALMANAC data in which information about positions and azimuths of satellites is included and using the calculated current position of the vehicle and current time; searching road candidates positioned around the vehicle based on the calculated current position of the vehicle; and estimating the direction of the vehicle using information about the predicted satellite candidates and the searched road candidates.

Furthermore, according to embodiments of the present disclosure, a non-transitory computer readable medium contains program instructions for estimating a direction of a vehicle, the program instructions when executed by a processor causing the processor to: calculate a current position of the vehicle and a current time using a received satellite signal; predict satellite candidates that are observable at the calculated current position of the vehicle using ALMANAC data in which information about positions and azimuths of satellites is included and using the calculated current position of the vehicle and current time; search road candidates positioned around the vehicle based on the calculated current position of the vehicle; and estimate the direction of the vehicle using information about the predicted satellite candidates and the searched road candidates.

BRIEF DESCRIPTION OF THE DRAWINGS

The above and other objects, features and advantages of the present disclosure will be more apparent from the following detailed description taken in conjunction with the accompanying drawings.

FIGS. 2A to 5 are illustrative views illustrating examples for describing an operation for estimating a direction by the apparatus for estimating a direction of a vehicle according to embodiments of the present disclosure.

Figure 1:
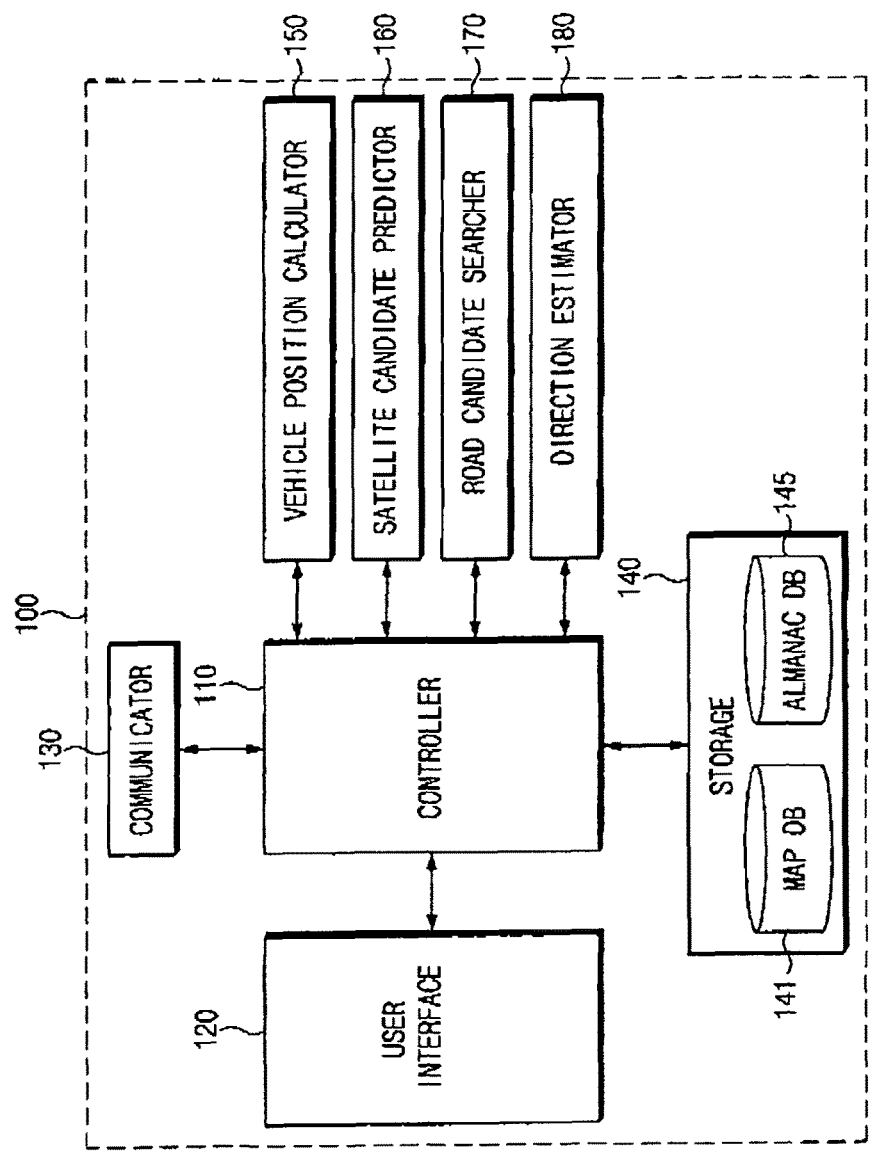
FIG. 1 is a block diagram illustrating an apparatus for estimating a direction of a vehicle according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

It is to be noted that technical terms used in the present disclosure are used in order to describe only specific exemplary embodiments rather than restricting the present disclosure. In addition, unless indicated otherwise in the present disclosure, it is to be understood that all the technical terms used in the present disclosure are construed as meaning as those that are generally understood by those who skilled in the art rather than as excessively comprehensive meaning and excessively reduced meaning. In addition, when the technical terms used in the present disclosure are wrongly technical terms that do not accurately indicate the technical spirit of the present disclosure, it is to be understood that the terms are replaced with the technical terms understood by those skilled in the art. Further, the general terms used in the present disclosure must be understood according to the terms defined by the dictionary or the context and should not be excessively reduced meanings.

In addition, singular forms used in the present disclosure are intended to include plural forms unless the context clearly indicates otherwise. In the present disclosure, it is to be noted that the terms "configured of," "including," or the like, are not be construed as necessarily including several components or several steps described in the present disclosure and some of the above components or steps may not be included or additional components or steps are construed as being further included.

Terms including an ordinal number such as first, second, or the like, used in the present disclosure may be used to describe various components. However, these components are not limited to these terms. Terms are used only in order to distinguish one component from another component. For example, the "first" component may be named the "second" component, and vice versa, without departing from the scope of the present disclosure.

As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Hereinafter, embodiments of the present disclosure will be described in detail with reference to the accompanying drawings. The same reference numerals will be used to describe the same or like components, independent of the reference numerals and an overlapped description of the same components will be omitted.

Further, when it is decided that the detailed description of the known art related to the present disclosure may obscure the gist of the present disclosure, the detailed description thereof will be omitted. In addition, it is to be noted that the accompanying drawings are provided only in order to allow the spirit of the present disclosure to be easily understood and is not to be interpreted as limiting the spirit of the present disclosure.

FIG. 1 is a block diagram illustrating an apparatus for estimating a direction of a vehicle according to embodiments of the present disclosure.

The apparatus 100 for estimating a direction of a vehicle according to an exemplary embodiment of the present disclosure (hereinafter, referred to as an "apparatus for estimating a direction") may be implemented in the vehicle. The vehicle may be a self-driving vehicle, and the apparatus 100 for estimating a direction of a vehicle may be formed integrally with internal control units of the vehicle or be implemented as a separate apparatus and be connected to the internal control units of the vehicle by separate connecting means. The apparatus 100 for estimating a direction of a vehicle may be operated in connection with a sensor, an engine, a motor, and the like, of the vehicle, or be operated in connection with a control unit or system controlling the sensor, the engine, or the motor.

Referring to FIG. 1, the apparatus 100 for estimating a direction of a vehicle may include a controller 110, a user interface 120, a communicator 130, a storage 140, a vehicle position calculator 150, a satellite candidate predictor 160, a road candidate searcher 170, and a direction estimator 180. The controller 110 may process signals transferred between the respective components of the apparatus 100 for estimating a direction of a vehicle.

First, the user interface 120 may include an input means for receiving a control command input from a user and an output means outputting an operation state, an operation result, and the like, of the apparatus 100 for estimating a direction of a vehicle. The input means may be a key button, or may be a mouse, a joystick, a jog shuttle, a stylus pen, or the like. In addition, the input means may also be a soft key implemented on a display. The output means may include a display, or may include an audio output means such as a speaker. In the case in which a touch sensor such as a touch film, a touch sheet, a touch pad, or the like, is provided in the display, the display may be operated as a touch screen, and may be implemented in a form in which the input means and the output means are integrated with each other. The display may include at least one of a liquid crystal display (LCD), a thin film transistor-liquid crystal display (TFT LCD), an organic light-emitting diode (OLED), a flexible display, a field emission display (FED), a 3D Display, and the like.

The communicator 130 may include a communication module supporting a communication interface with electric components and/or control units provided in the vehicle 10. As an example, the communication module may be communicatably connected to the instrument panel, the display, and the like, provided in the vehicle to transmit an operation state of the apparatus 100 for estimating a direction to the display. In addition, the communication module may transmit and receive signals to and from a self-driving system and/or a global navigation satellite system (GNSS).

The communicating module may include a module supporting vehicle network communication such as controller area network (CAN) communication, local interconnection network (LIN) communication, flex-ray communication, or the like. In addition, the communication module may include a global positioning system (GPS) module supplying satellite communication, a GNSS module, or the like. The communicating module may also include a module for wireless Internet access or a module for short range communication.

The storage 140 may store data, a program, and the like, required for operating the apparatus 100 for estimating a direction therein. The storage 140 may also store a set value for an operation of the apparatus 100 for estimating a direction therein. As an example, the storage 140 may store an algorithm for calculating a position of the vehicle from a satellite signal received through the GNSS therein, and may store a condition value, or the like, for searching a distribution of satellites or searching road candidates around the vehicle position on the basis of the current position therein.

In addition, the storage 140 may include a map database (DB) 141 in which map data are stored. The map data may be received from the GNSS or a navigation system. Meanwhile, the storage 140 may further include an ALMANAC DB 145 in which ALMANAC data are stored. Here, ALMANAC means a series of variables included in a message received from the GNSS, for example a bundle such as satellite orbit information, Kepler parameter, time correction, an atmosphere delay variable, a satellite health state, and the like. The ALMANAC data may be used to calculate approximate positions of the satellites. The ALMANAC data may have a format such as YUMA, SEM, or the like.

The storage 140 may include a storage medium such as a random access memory (RAM), a static random access memory (SRAM), a read only memory (ROM), a programmable read only memory (PROM), an electrically erasable programmable read only memory (EEPROM), or the like.

Figure 2B:
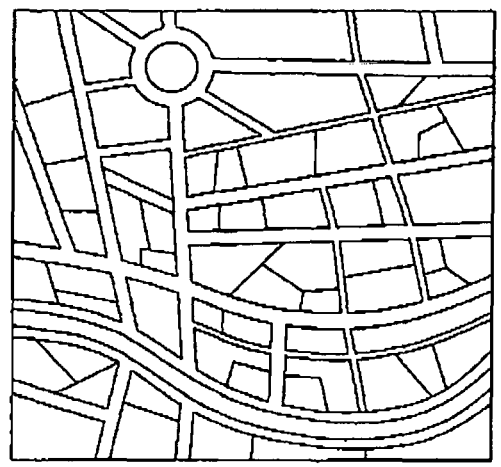
Figure 2A:
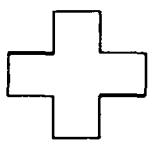
Figure 2A:
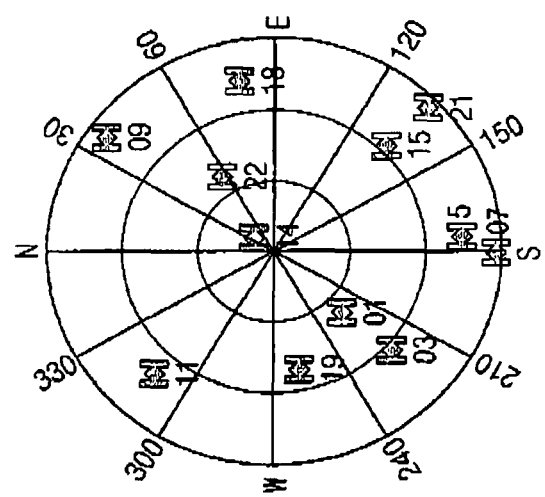

The controller 110 may control operations of the vehicle position calculator 150, the satellite candidate predictor 160, and the road candidate searcher 170. The direction estimator 180 may determine the direction of the vehicle in a stop state using data deduced by the vehicle position calculator 150, the satellite candidate predictor 160, and the road candidate searcher 170. As an example, the direction estimator 180 may determine the direction of the vehicle by array information of satellites predicted by comparing the satellite candidate predictor 160 and illustrated in FIG. 2A and roads searched by the road candidate searcher 170 and illustrated in FIG. 2B with each other.

When a satellite signal (e.g., a GPS signal or a GNSS signal) is received through the communicator 130, the controller 110 confirms whether or not the received satellite signal includes the ALMANAC data. In the case in which the received satellite signal includes the ALMANAC data, the controller 110 may update information stored in the ALMANAC DB 145 using the ALMANAC data. As an example, the controller 110 may update information such as positions, azimuth angles, elevations, and the like, of the satellites stored in the ALMANAC DB 145 using the received ALMANAC data.

In addition, when the satellite signal is received, the controller 110 transfers the received satellite signal to the vehicle position calculator 150. In this case, the vehicle position calculator 150 calculates a current position of the vehicle and a current time using the GNSS signal transferred from the controller 110. The vehicle position calculator 150 may store information on the current position of the vehicle and the current time calculated as described above in the storage 140. Therefore, the controller 110 may transfer the information on the current position of the vehicle and the current time to the satellite candidate predictor 160.

The satellite candidate predictor 160 searches the distribution of satellites on the basis of the information on the current position of the vehicle and the current time. In this case, the satellite candidate predictor 160 may search the distribution of the satellites on the basis of the current position using the ALMANAC data stored in the ALMANAC DB 145, and may predict satellite candidates that may be observed at the current position and in the current time from the searched information. An example of an operation of predicting satellite candidates will be described with reference to FIGS. 3A and 3B.

FIG. 3A illustrates GPS ALMANAC data GPS satellite PRN-01 to PRN-ALMANAC data may include information such as 'ID', 'Health', 'Eccentricity', 'Time of Applicability', 'Orbital Inclination', 'Rate of Right Ascen', 'SORT', 'Right Ascen at Week', 'Argument of Perigee', 'Mean Anom', 'AF0', 'Af1', 'week', and the like, on a satellite, for example, 'PRN-05', as illustrated in FIG. 3A.

Therefore, the satellite candidate predictor 160 may predict satellite candidates that may be observed at the current position of the vehicle and in the current time from information on each satellite of the ALMANAC data.

As an example, when the current position of the vehicle is '37.323796 degrees latitude and 126.952440 degrees longitude' and the current time is 8:40:10 on Mar. 22, 2016, satellites that may be observed at the corresponding position and in the corresponding time may be represented as illustrated in FIG. 3B. As illustrated in FIG. 3B, the satellite candidates that may be observed at the current position of the vehicle may be PRN-05(311), PRN-15(313), PRN-20 (315), PRN-21(317), and the like. The satellite candidate predictor 160 may store a prediction result of the satellite candidates in the storage 140.

Figure 5:
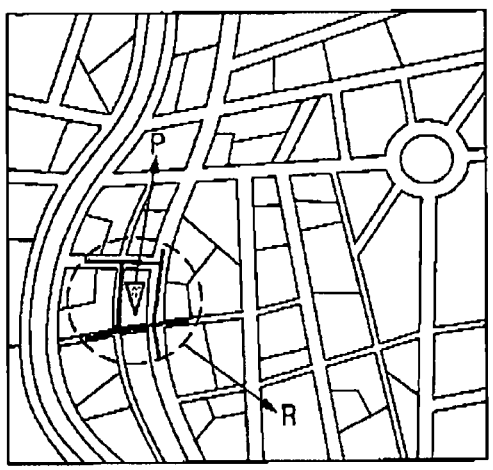

In addition, the controller 110 may transfer the information on the current position of the vehicle and the current time to the road candidate searcher 170. The road candidate searcher 170 searches road candidates around the vehicle on the basis of the current position of the vehicle. In this case, the road candidate searcher 170 may search the road candidates around the current position using the map data stored in the map DB 141. In the case in which the road candidate searcher 170 searches the road candidates around the current position using the map data, the road candidate searcher 170 may search one road candidate around the current position P of the vehicle, or may search a plurality of road candidates in a road candidate search range R as illustrated in FIG. 5. The road candidate searcher 170 may store a search result of the road candidates in the storage 140.

When information on the satellite candidates and the road candidates is stored in the storage 140 by the satellite candidate predictor 160 and the road candidate searcher 170, the direction estimator 180 may estimate the direction of the vehicle using the information on the satellite candidates and the road candidates stored in the storage 140. In this case, when the road candidate is searched around the current position of the vehicle using the map data, the direction estimator 180 may decide that the vehicle is positioned on a road corresponding to the searched road candidate.

Figure 4:
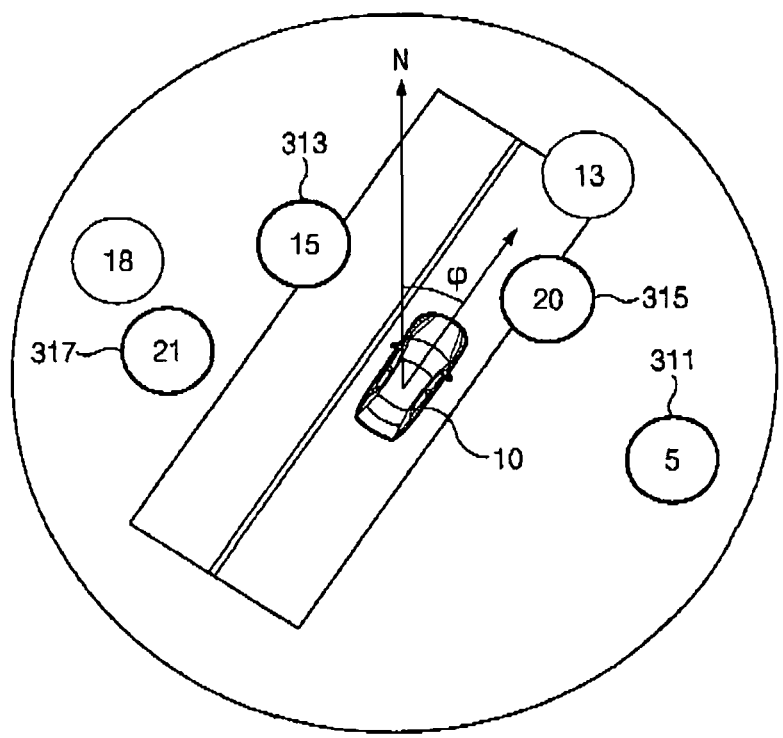

When the satellite candidates PRN-05 311, PRN-15 313, PRN-20 315, and PRN-21 317 predicted in FIGS. 3A and 3B are disposed on a road on which the vehicle is located, they may be represented as illustrated in FIG. 4.

The direction estimator 180 may determine that an azimuth of the road on which the vehicle 10 in the stop state is positioned is any one of φ or 180+φ. In this case, a difference value between an azimuth of the satellite observed at the current position of the vehicle and the azimuth of the road may be represented by a set S, which may be represented as follows:

$$S_\phi = \{\theta_1 - \phi, \ldots, \theta_i - \phi\}$$

$$S_{180+\phi} = \{\theta_1 - (180+\phi), \ldots, \theta_i - (180+\phi)\}.$$

Here, φ means the azimuth of the road, i={1, 2, ..., n}, and $\theta_i$ means an azimuth for n satellite candidates predicted through the ALMANAC data.

As an example, when it is assumed that φ is 15 degrees, the azimuth of the road on which the vehicle 10 is positioned is 15 degrees or 195 degrees. In this case, referring azimuths of the satellite candidates PRN-05, PRN-15, PRN-20, and the like, illustrated in FIG. 3B, the above set S may be represented as follows:

$$S_{15} = \{107.6 - 15, 332 - 15, 60.8 - 15, \ldots\}$$

$$S_{195} = \{107.6 - 195, 332 - 195, 60.8 - 195, \ldots\}.$$

Therefore, the direction estimator 180 may estimate the direction of the vehicle by obtaining azimuth and elevation information of each satellite from the satellite signals and comparing the obtained azimuth and elevation information with two sets Sφ and S180+φ.

In the case in which the plurality of road candidates are searched by the road candidate searcher 170, the direction estimator 180 may select one of the plurality of road candidates and determine the direction of the vehicle using the selected road candidate, wherein a position error between the selected road candidate and an array of satellite candidates becomes the minimum value.

As described above, since the apparatus for estimating a direction of a vehicle according to embodiments of the present disclosure estimates the direction of the vehicle by comparing the array of the satellite candidates and the road candidates searched on the basis of the current position of the vehicle with each other, the apparatus for estimating a direction of a vehicle may determine the direction of the vehicle even in a state in which the vehicle stops.

An operation flow of the apparatus for estimating a direction of a vehicle according to an exemplary embodiment of the present disclosure configured as described above will be described below in more detail.

Figure 6:
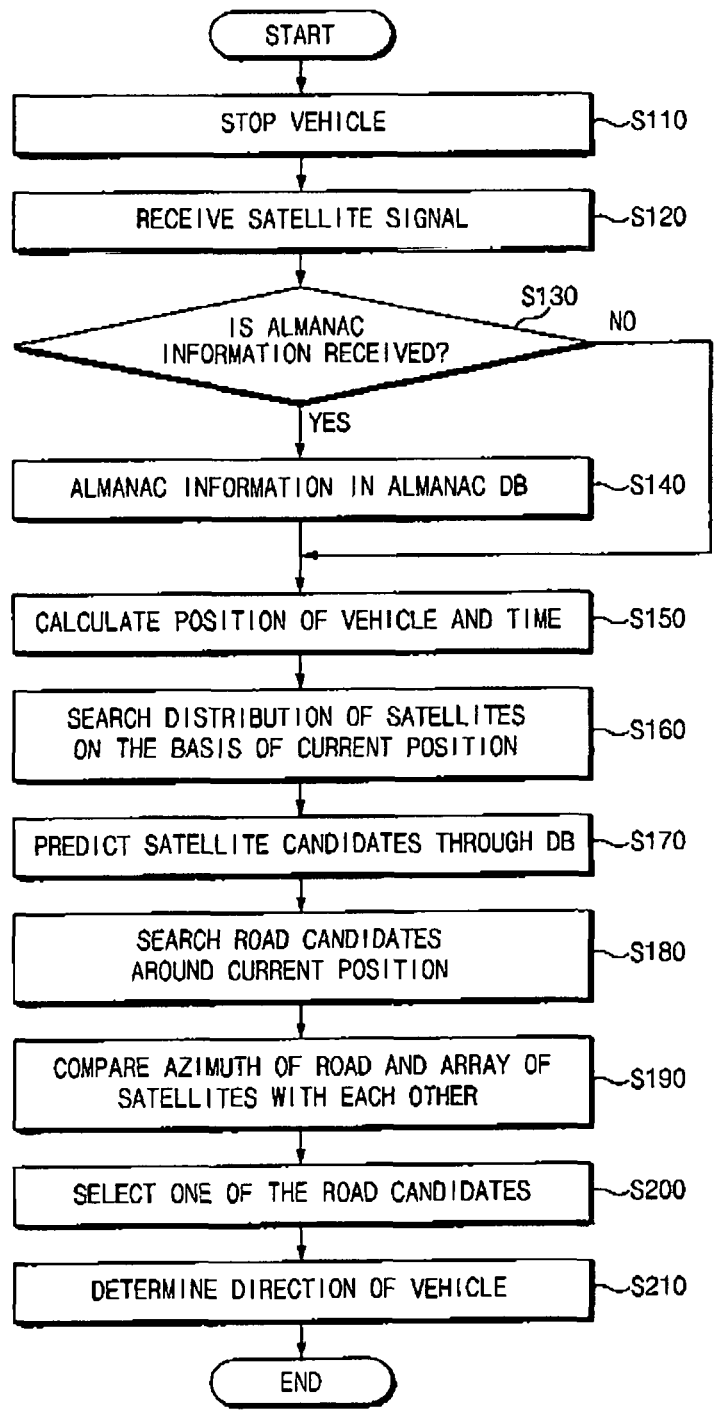
FIG. 6 is a flow chart illustrating operations of a method for estimating a direction of a vehicle according to embodiments of the present disclosure.

FIG. 6 is a flow chart illustrating operations of a method for estimating a direction of a vehicle according to embodiments of the present disclosure.

As illustrated in FIG. 6, when the satellite signal such as the GPS signal or the GNSS signal is received in a state in which the vehicle stops (S110 and S120), the apparatus for estimating a direction confirms whether or not ALMANAC information is included in the received satellite signal to thereby be received together with the received satellite signal. In the case in which the ALMANAC information is received by the satellite signal received in 'S120' (S130), the apparatus for estimating a direction stores and updates the received ALMANAC information in the ALMANAC DB 145 (S140).

Meanwhile, the apparatus for estimating a direction may calculate a position of the vehicle and a time from the satellite signal received in 'S120' (S150). The apparatus for estimating a direction searches the distribution of the satellites on the basis of the current position using information on the position of the vehicle and the time calculated in 'S150' (S160).

In this case, the apparatus for estimating a direction may search the distribution of the satellites on the basis of the current position using the ALMANAC data stored in advance in the ALMANAC DB 145 (S160), and may predict satellite candidates that may be observed at the current position and in the current time from the searched information (S170).

Then, the apparatus for estimating a direction may search the road candidates around the vehicle on the basis of the current position of the vehicle (S180). In this case, the road candidate searcher 170 may search the road candidates around the current position using the map data stored in advance in the map DB 141.

The apparatus for estimating a direction compares the array of the satellite candidates predicted in 'S170' and the road candidates searched in 'S180' with each other, and determines the direction of the vehicle (S210). Before S210', the apparatus for estimating a direction may select one of the road candidates (S200). Here, a position error between the selected road candidate and the array of the satellite candidates may become the minimum value. In 'S210', the apparatus for estimating a direction may determine the direction of the vehicle using a difference value between the azimuth of the satellite candidates and the azimuth of the road candidates.

Figure 7:
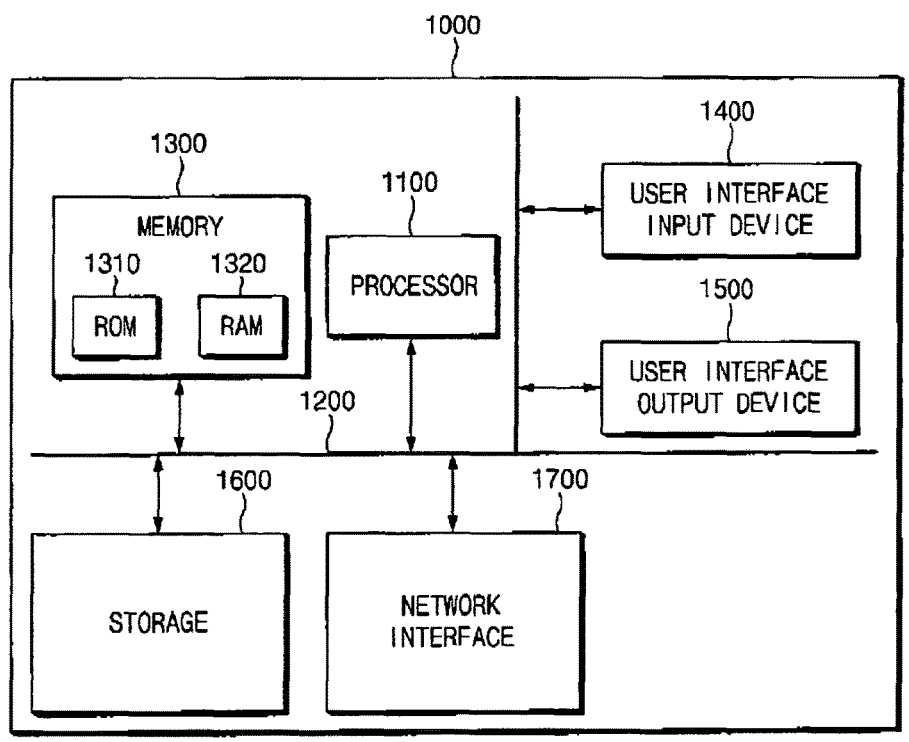
FIG. 7 is a block diagram illustrating a configuration of a computing system implementing an apparatus according to embodiments of the present disclosure.

FIG. 7 is a diagram illustrating a computing system to which the apparatus according to the present disclosure is applied.

As shown in FIG. 7, the computing system 1000 may include at least one processor 1100, a memory 1300, a user interface input device 1400, a user interface output device 1500, a storage 1600, and a network interface 1700 connected through a bus 1200.

The processor 1100 may be a semiconductor device that executes processing of commands stored in a central processing unit (CPU) or the memory 1300 and/or the storage 1600. The memory 1300 and the storage 1600 may include various types of volatile or non-volatile storage media. For example, the memory 1300 may include a read only memory (ROM) and a random access memory (RAM).

Therefore, steps of a method or an algorithm described in association with the embodiments disclosed in the specification may be directly implemented by hardware and software modules executed by the processor 1100, or a combination thereof. The software module may reside in storage media (that is, the memory 1300 and/or the storage 1600) such as a RAM, a flash memory, a ROM, an EPROM, an EEPROM, a register, a hard disk, a removable disk, and a CD-ROM. The exemplary storage medium is coupled to the processor 1100 and the processor 1100 may read information from the storage medium and write the information in the storage medium. As another method, the storage medium may be integrated with the processor 1100. The processor and the storage medium may reside in an application specific integrated circuit (ASIC). The ASIC may reside in a personal terminal. As yet another method, the processor and the storage medium may reside in the personal terminal as individual components.

The above description just illustrates the technical spirit of the present disclosure, and various modifications and transformations can be made to those skilled in the art without departing from an essential characteristic of the present invention. Therefore, the embodiments disclosed in the present disclosure are used to not limit but describe the technical spirit of the present disclosure, and the scope of the technical spirit of the present disclosure is not limited by the embodiments disclosed herein. The scope of the present disclosure should instead be interpreted by the appended claims, and it should be analyzed that all technical spirit in the equivalent range is intended to be embraced by the scope of the present disclosure.

What is claimed is:

1. An apparatus for estimating a direction of a vehicle, the apparatus comprising:
    a vehicle position calculator calculating a current position of the vehicle and a current time using triangulation on the basis of satellite signals received from satellites;
    a satellite candidate predictor predicting satellite candidates that are observable at the calculated current position of the vehicle using ALMANAC data in which information about positions and azimuths of the satellites is included and using the calculated current position of the vehicle and current time;
    a road candidate searcher searching road candidates positioned around the vehicle based on the calculated current position of the vehicle; and
    a direction estimator estimating the direction of the vehicle using information about the predicted satellite candidates and the searched road candidates,
    wherein the direction estimator estimates the direction of the vehicle by obtaining a difference value between an azimuth of the satellite candidates and an azimuth of the road candidates and comparing azimuth information of the satellites obtained from the satellite signals with the difference value.

2. The apparatus for estimating the direction of the vehicle according to claim 1, wherein the road candidate searcher searches the road candidates positioned around the vehicle based on the calculated current position of the vehicle using a map database in which map data including information about positions and azimuths of roads is stored in advance.

3. The apparatus for estimating the direction of the vehicle according to claim 1, wherein the direction estimator determines that the azimuth of the road candidates is any one of $\varphi$ and $180+\varphi$.

4. The apparatus for estimating the direction of the vehicle according to claim 1, wherein:
    in a case in which a plurality of road candidates are searched by the road candidate searcher, the direction estimator selects one of the plurality of road candidates and determines the direction of the vehicle using the selected road candidate, and
    a position error between the selected road candidate and an array of the predicted satellite candidates is minimized.

5. The apparatus for estimating the direction of the vehicle according to claim 1, further comprising:
    a controller updating information stored in an ALMANAC database using corresponding ALMANAC data when the received satellite signal includes the ALMANAC data.

6. The apparatus for estimating the direction of the vehicle according to claim 5, wherein the ALMANAC data includes one or more of satellite orbit information, Kepler parameter information, time correction information, atmosphere delay variable information, and satellite health state information about the satellites.

7. A method for estimating a direction of a vehicle, the method comprising:
    calculating a current position of the vehicle and a current time using triangulation on the basis of satellite signals received from satellites;
    predicting satellite candidates that are observable at the calculated current position of the vehicle using ALMANAC data in which information about positions and azimuths of the satellites is included and using the calculated current position of the vehicle and current time;
    searching road candidates positioned around the vehicle based on the calculated current position of the vehicle; and
    estimating the direction of the vehicle using information about the predicted satellite candidates and the searched road candidates,
    wherein the estimating of the direction of the vehicle comprises obtaining a difference value between an azimuth of the satellite candidates and an azimuth of the road candidates and comparing azimuth information of the satellites obtained from the satellite signals with the difference value.

8. The method for estimating the direction of the vehicle according to claim 7, wherein the searching of the road candidates comprises:
    searching the road candidates positioned around the vehicle based on the calculated current position of the vehicle using a map database in which map data including information about positions and azimuths of roads is stored in advance.

9. The method for estimating the direction of the vehicle according to claim 7, wherein the estimating of the direction of the vehicle comprises:
    determining the azimuth of the road candidates searched around the calculated current position of the vehicle to be any one of $\varphi$ and $180+\varphi$.

10. The method for estimating the direction of the vehicle according to claim 7, wherein the estimating of the direction of the vehicle comprises:
    in a case in which a plurality of road candidates are searched, selecting one of a plurality of road candidates; and
    determining the direction of the vehicle using the selected road candidate, wherein a position error between the selected road candidate and an array of the predicted satellite candidates is minimized.

11. The method for estimating the direction of the vehicle according to claim 7, further comprising:
    determining whether the received satellite signal includes the ALMANAC data; and
    updating information stored in an ALMANAC database using corresponding ALMANAC data when the received satellite signal includes the ALMANAC data.

12. The method for estimating the direction of the vehicle according to claim 11, wherein the predicting of the satellite candidates comprises:
    predicting the satellite candidates that are observable at the calculated current position of the vehicle based on the updated ALMANAC database.

13. A non-transitory computer readable medium containing program instructions for estimating a direction of a vehicle, the program instructions when executed by a processor causing the processor to:
    calculate a current position of the vehicle and a current time using triangulation on the basis of satellite signals received from satellites;
    predict satellite candidates that are observable at the calculated current position of the vehicle using ALMANAC data in which information about positions and azimuths of the satellites is included and using the calculated current position of the vehicle and current time;
    search road candidates positioned around the vehicle based on the calculated current position of the vehicle; and
    estimate the direction of the vehicle using information about the predicted satellite candidates and the searched road candidates,
    wherein the processor estimates the direction of the vehicle by obtaining a difference value between an azimuth of the satellite candidates and an azimuth of the road candidates and comparing azimuth information of the satellites obtained from the satellite signals with the difference value.

* * * * *